United States Patent [19]

Mayer

[11] Patent Number: 4,565,405
[45] Date of Patent: Jan. 21, 1986

[54] SEAT MAT ASSEMBLY WITH HEADRESTS

[76] Inventor: Camille Mayer, 12315 Kilbourne, Detroit, Mich. 48213

[21] Appl. No.: 618,877

[22] Filed: Jun. 8, 1984

[51] Int. Cl.⁴ .............................................. A47C 7/02
[52] U.S. Cl. .................................. 297/230; 297/391; 297/397; 297/219
[58] Field of Search ............... 297/397, 394, 230, 231, 297/219, 229, 457, DIG. 1

[56] References Cited

U.S. PATENT DOCUMENTS

| | | | |
|---|---|---|---|
| 969,251 | 9/1910 | Denzer | 297/397 |
| 2,582,571 | 1/1952 | Thoma | 297/397 |
| 2,908,766 | 10/1959 | Taylor | 297/219 X |
| 3,014,761 | 12/1961 | Otto | 297/230 |
| 3,024,068 | 3/1962 | Eames | 297/DIG. 1 |
| 3,220,767 | 11/1965 | Hendrickson | 297/457 |
| 3,346,298 | 10/1967 | Champion | 297/457 |
| 3,508,788 | 4/1970 | Barton et al. | 297/397 |
| 3,537,750 | 11/1970 | Lohr | 297/397 |
| 4,040,881 | 8/1977 | Wallace | 297/DIG. 1 |
| 4,440,443 | 4/1984 | Nordskog | 297/397 |

Primary Examiner—Francis K. Zugel
Attorney, Agent, or Firm—Cullen, Sloman, Cantor, Grauer, Scott & Rutherford

[57] ABSTRACT

A seat and backrest mat comprises opposed top and bottom covers and an interposed thick layer of resilient material, peripherally interconnected around the perimeter thereof, defining a seat portion and a connected back portion. A pair of enlarged laterally spaced resilient headrests are mounted upon the upper end of the back portion and project forwardly thereof.

2 Claims, 6 Drawing Figures

U.S. Patent  Jan. 21, 1986  4,565,405
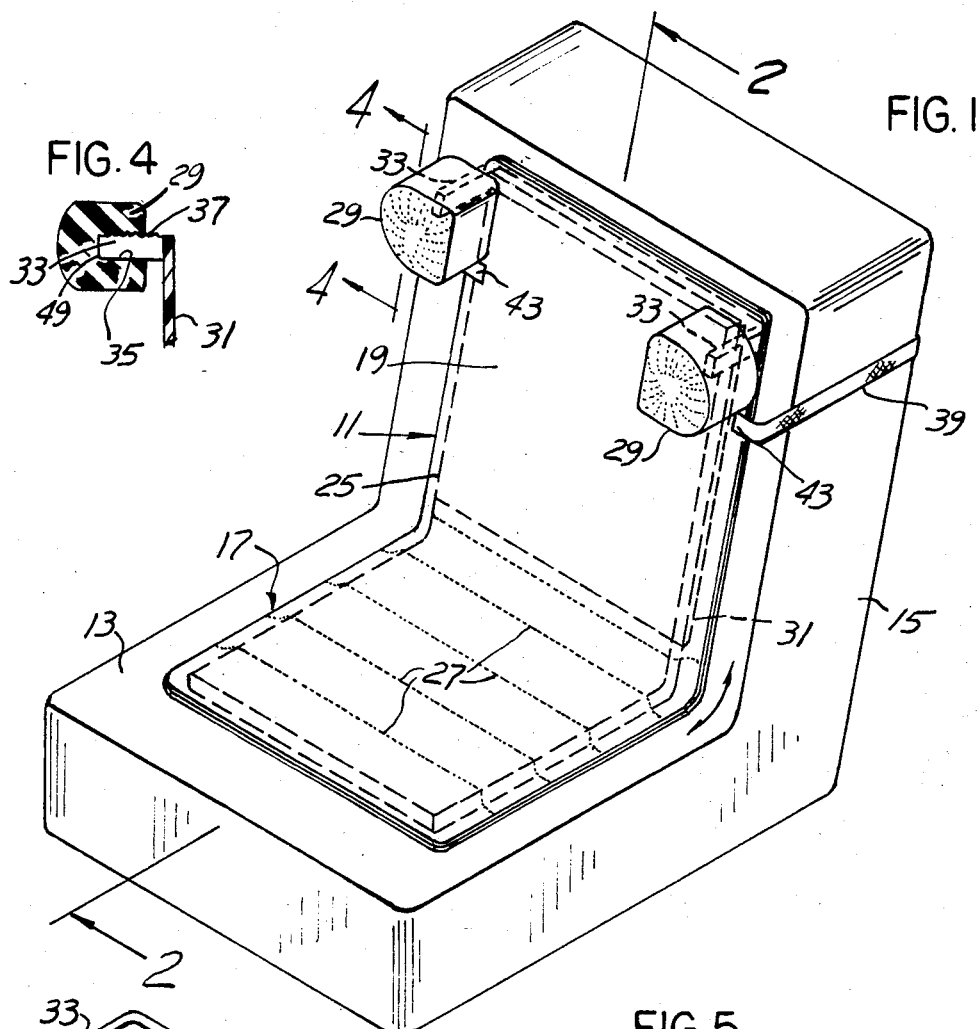
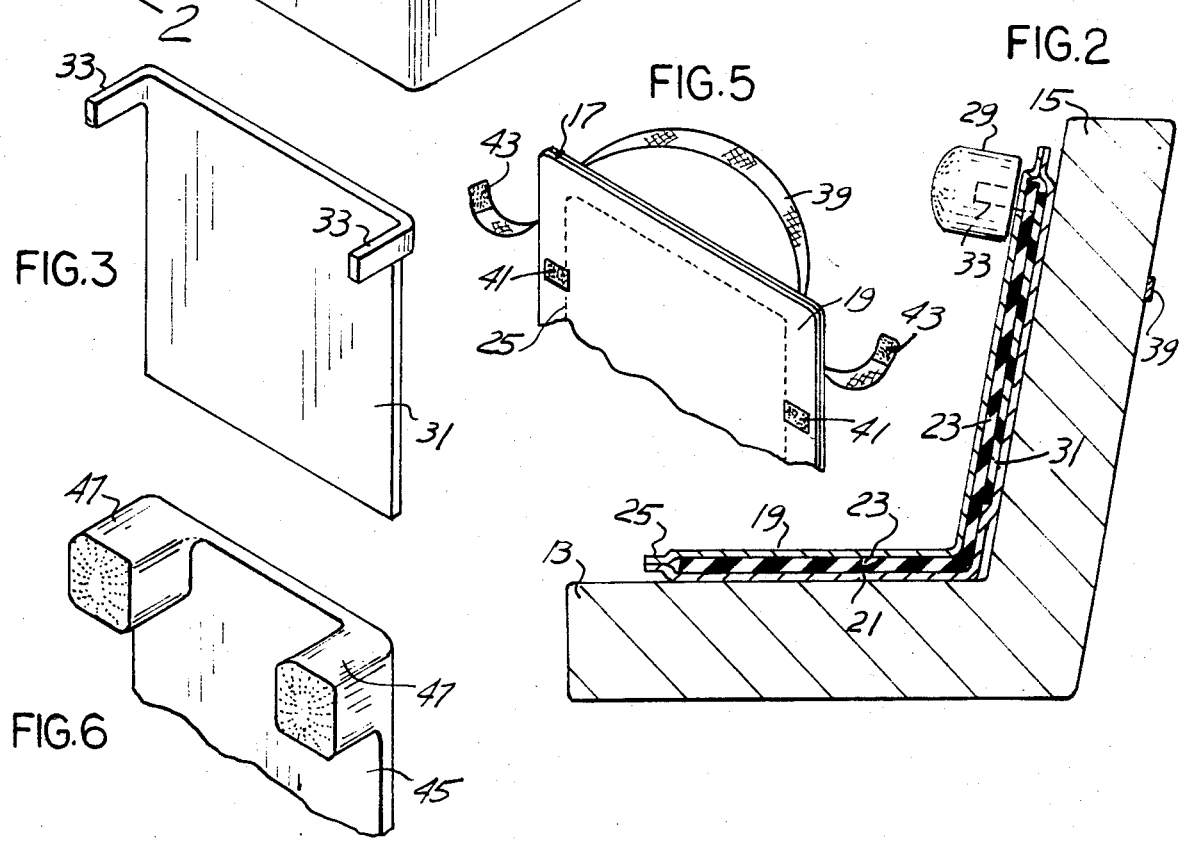

SEAT MAT ASSEMBLY WITH HEADRESTS

The present invention is directed to a seat and backrest mat which is mountable upon a seat having a backrest wherein there is applied to the backrest adjacent its upper end a pair of laterally spaced headrests.

BACKGROUND OF THE INVENTION

Heretofore, head and neck rests have been provided for automobile seat backs and in some manner adjustably mounted upon the seat back and normally mounting a unitary headrest to protectively engage the back of head and the neck or a pair of headrests. Most of the headrests of this type are normally suspended from the top of the seat back and primarily are provided of a uniform shape to engage portions of the users neck and head.

SUMMARY OF THE INVENTION

It is an important feature of the present invention to provide a seat and back rest mat including top and bottom covers and a layer of resilient material, such as sponge rubber, providing a soft resilient and comfortable mat applicable to a seat and a backrest, wherein there is mounted upon the mat at its upper end a pair of laterally spaced resilient headrests.

An important feature is to provide a resilient seat and backrest mat having top and bottom covers of a predetermined shape with an interposed layer of resilient material of the same shape wherein the three members are interconnected around their periphery by stitching or other fastening means.

Another feature is to provide a resilient flexible seat and backrest mat including a seat portion and a connected back portion for respective registry with a seat and backrest, wherein a pair of formed enlarged laterally spaced resilient headrests are mounted upon the upper end of the back portion and project forwardly thereof adapted to protectively receive opposite sides of the user's or passengers head.

Another feature includes applied to the back portion of the mat a looped strap adapted to retainingly engage the backrest to anchor the mat and prevent inadvertent folding forward of its backrest portion.

Another feature includes a series of rows of transverse stitching interconnecting respective covers and resilient layer to permit selective folding of the seat portion and back portion as the mat is slid along the seat and backrest to match the height of the person using the mat.

An important feature is to include within the mat and secured therein an elongated stiffener liner sheet of a plastic material which is interposed between one of the covers and the resilient layer and upon its opposite sides secured thereto, and wherein the resilient headrests are secured to the stiffener liner.

Another feature is to provide forwardly projecting supports upon upper end portions of the stiffener liner over which a pair of laterally spaced resilient headrests are mounted and secured.

Still another feature is a modification wherein the stiffener sheet has formed upon the upper end thereof at its sides corresponding enlarged resilient headrests as an integral molded part thereof.

These and other objects and features will be seen from the following Specification and claims in conjunction with the appended drawing.

THE DRAWING

FIG. 1 is a front perspective view of a seat on which the present seat and backrest mat is adjustably mounted.

FIG. 2 is a vertical section taken in the direction of arrows 2—2 of FIG. 1.

FIG. 3 is a perspective view of the stiffener liner nested within the upper portion of the mat shown in FIGS. 1 and 2.

FIG. 4 is a fragmentary section taken in the direction of arrows 4—4 of FIG. 1.

FIG. 5 is a fragmentary perspective view of the back portion of the mat having an elastic looped strap connected thereto for retaining engagement with a backrest as shown in FIG. 1.

FIG. 6 is a fragmentary perspective view of a modified stiffener liner wherein the headrests are molded as an integral part thereof.

It will be understood that the above drawing illustrates merely preferred embodiments of the invention and that other embodiments are contemplated within the scope of the claims hereafter set forth.

DETAILED DESCRIPTION OF AN EMBODIMENT OF THE INVENTION

Referring to the drawing, a seat mat assembly with headrests is generally indicated at 11, FIG. 1, adapted for use in conjunction with a seat 13 and an associated backrest 15, such as for a vehicle and for any other form of seat having a backrest support including a chair or a bed, for illustration.

The elongated mat 17 has an elongated generally rectangular top cover 19, FIG. 2, of a suitable material, a bottom cover 21 of the same shape, and interposed therebetween a layer of resilient material 23, preferably of sponge rubber for illustration. The covers may be of fabric, plastic, fibre or Naugahyde(TM).

The mat is completed by a peripheral securing means which extends around the overlapped edges of the adjacent top and bottom covers and resilient layer 23.

In the illustrative embodiment, the securing means is a continuous peripheral stitching 25 arranged inwardly of the edges of the covers and resilient layer which extends around the perimeter thereof, FIG. 1. As an alternate to stiching, the peripheral portions of the mat may be secured together by heat or ultrasonic welding, other peripheral bonding or an adhesive.

The assembled and peripherally interconnected top and bottom covers 19, 21 and resilient layer 23 provides a seat portion mountable upon the seat 13 and connected thereto a back portion adapted for cooperative registry with backrest 15. Depending upon the height of the user, the mat 17 may be longitudinally adjusted as shown by the arrow, FIG. 1, for raising or lowering the pair of laterally spaced resilient headrests 29. These project from upper side portions of the back portion of the mat.

In the illustrative embodiment, the headrests are in the form of molded resilient sponge rubber or sponge plastic members which are secured to upper portions of the mat 17, FIG. 1, and project forwardly thereof. Particularly for one sleeping or resting upon the mat on the seat and backrest 13, 15, the laterally spaced formed resilient headrests protectively receive portions of the users head. These comfortably support the head of a sleeping user which tends to tip to one side or the other from an upright position.

In the illustrative embodiment, there is provided an elongated generally rectangular stiffener sheet 31, FIG. 3, made of a relatively stiff, yet flexible plastic material, such as polystyrene for illustration, which has on opposite sides at its upper end a pair of headrest supports or projections 33.

In the assembly of the top and bottom covers and intermediate resilient layer 23, the stiffener sheet 31 is interposed between one of the covers 19 and 21 and the adjacent sponge rubber layer 23. Said sheet at its opposite sides is secured to the assembled mat and by the same stitching 25 or other fastening means which peripherally secures the corresponding edges of the top and bottom covers and resilient layer 23.

In the illustrative embodiment the liner stiffener sheet 31 is interposed between the bottom cover 21 and the resilient layer 23 and suitably secured in position. In the completed assembly, the headrest supports 33 at the upper end of the liner stiffener project forwardly of the mat assembly, FIGS. 1, 2, 3 and 4.

Respective preformed enlarged foam rubber or other resilient headrests 29 are supportably mounted over the supports 33 and suitably secured thereto. In the illustrative embodiment, the respective molded plastic or sponge rubber headrests 29 are formed with central rearwardly extending bores 35, FIG. 4, which receive the respective supports 33. Rearwardly inclined serrations 37 may be formed upon the top surface of the headrest supports 33 for increased frictional retaining engagement with interior portions of the headrests 29 resisting separation thereof.

A suitable adhesive may be applied to the supports 33 to further anchor the headrest thereon. The serrations 37 may be along the bottom edges of supports 33. In some situations where the size and weight of the headrest 29 are sufficient to have a tendancy to tip the backrest portion of the mat 17 forwardly a suitable backrest strap or loop 39 of elastic material is employed. The free ends of the strap 39 are suitably secured to the top cover 19 of the mat with the looped strap extending around adjacent portions of backrest 15.

Any suitable means may be employed for anchoring the free ends of the strap 39 to top cover 19. Stitching may be employed, or snap fasteners. In the illustrative embodiment, a pair of hook-loop pile strips 41 are suitably secured to the top cover 19 adjacent the top thereof, FIG. 5, adapted to register with corresponding hook-loop pile fasteners 43 upon the free ends of strap 39.

A modified stiffener liner is fragmentarily shown at 45 in FIG. 6, molded of a relatively stiff plastic material as for example, polystyrene and wherein laterally spaced headrests 47 are molded as an integral part thereof projecting forwardly of stiffener sheet 45. The modified stiffener liner 45 is assembled between the bottom cover 21 and resilient layer 23 and secured thereto along its side edges as by the same fastening or stitching shown at 25, FIG. 1.

As shown in FIG. 2, resilient layer 23 is of considerable thickness with respect to the thickness of the respective covers 19 and 21. These covers may be made of a fabric, leather, a fiber, plastic or Naugahyde(TM) for the comfort of the user.

Having described my invention, reference should now be had to the following claims.

I claim:

1. A seat and backrest mat mountable upon a seat having a backrest comprising elongated opposed top and bottom covers of a predetermined shape;

a layer of resilient material of the same shape interposed between the covers;

continuous securing means extending around the perimeters of and peripherally interconnecting said covers and resilient layer, defining a seat portion and a connected back portion;

an elongated stiffener liner sheet interposed between one of said covers and resilient layer of at least said back portion and along its opposite sides secured thereto by said securing means, said stiffener sheet having sufficient flexibility to permit selective folding and redefinition of the connected seat portion and back portion as the mat is slid along the seat and backrest to match the height of the person using the mat;

a pair of laterally spaced headrest supports secured to said stiffener sheet at its top and projecting forwardly therefrom;

and a pair of formed enlarged laterally spaced resilient headrests each having a central rearwardly opening aperture snugly receiving and fixedly supported and secured upon said headrest supports respectively.

2. A seat and backrest mat mountable upon a seat having a backrest comprising elongated opposed top and bottom covers of a predetermined shape;

a layer of resilient material of the same shape interposed between the covers;

continuous securing means extending around the perimeters of and peripherally interconnecting said covers and resilient layer, defining a seat portion and a connected back portion;

an elongated stiffener liner sheet interposed between one of said covers and resilient layer of at least said back portion and along its opposite sides secured thereto by said securing means, said stiffener sheet having sufficient flexibility to permit selective folding and redefinition of the connected seat portion and back portion as the mat is slid along the seat and backrest to match the height of the person using the mat;

and a pair of formed enlarged laterally spaced resilient headrests upon the upper end of said back portion and projecting forwardly therefrom, said headrests being molded as a part of and projecting from the top of said stiffener sheet.

* * * * *